United States Patent Office 3,314,745
Patented Apr. 18, 1967

3,314,745
PROCESS FOR PREVENTING FECAL ODORS IN CHEMICAL TOILETS
Nathan J. Krotinger, La Mirada, and Isadore Nusbaum, San Diego, Calif., assignors to Zevel Corporation, La Mirada, Calif., a corporation of California
No Drawing. Filed Feb. 25, 1963, Ser. No. 260,858
3 Claims. (Cl. 21—55)

This invention relates to liquids for use in sanitary, self-contained recirculating and non-recirculating chemical toilets such as used in airplanes, boats, trailers, cabins, fallout shelters, construction areas, and other locations which are not provided with sewer connections.

Human excreta and other wastes produced in locations not provided with sewer facilities are generally collected in septic tanks, cesspools or chemical toilets. The salts of this invention are particularly suitable for use in chemical toilets because in these there is no dilution of the excretory wastes.

Chemical toilets are emptied at varying times after use, therefore the liquids used therein are required to be chemically stable for long periods of time. Another requirement is that the liquid must not have an inherent undesirable odor, and it should be capable of suppressing odors resulting from use of the toilets. The liquids should not cause any water pollution problem from the emptying of the toilets, nor produce an eyesore showing when being disposed of, for example, as from a boat in harbor; and in addition, the liquid must be disposable in a community sewerage system without damage thereto.

We have discovered that water soluble zinc salts applied in suitable concentrations in water will prevent chemical toilets from having a fecal odor, and also that such solutions are chemically stable and are odorless. The zinc ions will precipitate any dissolved sulfides in the aqueous solution in chemical toilets and will effectively prevent fecal odors. The reaction of the dissolved sulfides and zinc ions, for example, is $$Zn^{++} + S^{--} \rightarrow ZnS$$

The zinc sulfide is white and not offensive in appearance. The zinc ions are also bactericidal in nature and will reduce the coliform count of the wastes. The zinc salt used is preferably zinc sulfate, but any water soluble zinc salt such as chloride, nitrate, acetate, etc. may be used.

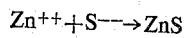

A small home-type chemical toilet has about 5 gallons capacity, while chemical toilets used in construction areas, etc., have about 50 gallons capacity. We have determined experimentally that an effective concentration of the zinc (as zinc ion) may be in the range from .01 to 1.0 pound of zinc per gallon of aqueous liquid, the minimum being determined by its effectiveness, and the maximum by reasons of undue waste, and/or by the solubility of the zinc salt. For example, a solution containing one-tenth pound of zinc sulfate per gallon has been found to be effective for the stated purposes in a small chemical toilet which is emptied and renewed every day, whereas in a large construction-type toilet which is emptied and renewed weekly and contains a large volume of liquid, is effective for the stated purposes when the solution contains two pound of zinc sulfate. The other water soluble zinc salts are equally effective at equivalent concentrations. Lower or higher concentrations of zinc may be selected, depending on the frequency of use of the sanitary facility.

Where heavy use, or a long detention of wastes is contemplated, the addition of oxygen-donating compounds such as soluble nitrate salts (for example, sodium nitrate) in an effective concentration will retard the septic activity by maintaining an aerobic condition in the solution. When the water soluble zinc salt selected for the suppression of fecal odors in the chemical toilet is zinc nitrate, this salt also furnishes the necessary oxygen to suppress septic activity. The amount of nitrate salt is selected to suppress the septic activity in the aqueous liquid for the expected retention time for said liquid.

Where disposal from marine chemical toilets in harbor areas is contemplated, the addition of a green or blue color to the chemical toilet solution will cause the wastes to be unobjectionable from an aesthetic consideration. Such a color can be produced by the use of inorganic salts, such as trivalent chromium in acid solutions buffered with acid salts, or colored chelated salts, such as the copper complex salt with ethylene diamine tetraacetic acid. Organic dyes stable under anaerobic conditions such as bromcresolgreen or malachite green oxalate can also be used, singly or in combination, to produce the desired color effect.

The zinc salts as above described have been found effective to prevent the formation of objectionable fecal odors, and other odors, such as from urine, can be readily masked by the use of odor-masking agents, or by pH control. Suitable odor masking agents are readily available commercially and their use is well known.

We claim:
1. The process for preventing fecal odors in sanitary, self-contained chemical toilets consisting essentially of adding to the liquid in said toilet prior to any addition thereto of fecal matter or urine, an amount of a water-soluble zinc salt and water to give a concentration of zinc as zinc ions in the range from .01 to 1.0 pound per gallon of aqueous liquid.

2. The process defined in claim 1 in which the zinc salt is zinc sulfate.

3. The process defined in claim 1 in which the zinc sail is zinc nitrate.

References Cited by the Examiner

UNITED STATES PATENTS

| | | | |
|---|---|---|---|
| 183,264 | 10/1876 | Howard | 4—22 |
| 280,320 | 6/1883 | Menard et al. | 71—3 |
| 3,107,216 | 10/1963 | Hamilton | 210—60 |

FOREIGN PATENTS 5,199  11/1881  Great Britain.

OTHER REFERENCES

Food Industries, vol. 13, No. 14, "Nitrate Kills Odor in Waste," by N. H. Sanborn, pp. 57–58 and 101, April 1941.

MORRIS O. WOLK, *Primary Examiner.*

F. W. BROWN, *Assistant Examiner.*